United States Patent
Chang et al.

(10) Patent No.: US 7,551,798 B2
(45) Date of Patent: Jun. 23, 2009

(54) APPARATUS FOR REDUCING ZIPPER OF IMAGE AND METHOD THEREOF

(75) Inventors: Hui-Huang Chang, Hsinchu (TW); Chia-Feng Lin, KaoHsiung (TW); Chun-Ming Kuo, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 857 days.

(21) Appl. No.: 10/714,634

(22) Filed: Nov. 18, 2003

(65) Prior Publication Data

US 2004/0096099 A1    May 20, 2004

(30) Foreign Application Priority Data

Nov. 19, 2002   (TW) .............................. 91133667 A

(51) Int. Cl.
*G06K 9/40* (2006.01)
*H04N 5/228* (2006.01)
*H04N 5/217* (2006.01)

(52) U.S. Cl. .................. 382/275; 348/222.1; 348/241

(58) Field of Classification Search ................ 382/155, 382/275
See application file for complete search history.

(56) References Cited

U.S. PATENT DOCUMENTS

| | | | |
|---|---|---|---|
| 5,751,844 A * | 5/1998 | Bolin et al. ................. 382/156 |
| 5,881,182 A   | 3/1999 | Fiete et al. .................. 382/275 |
| 6,744,916 B1* | 6/2004 | Takahashi .................... 382/162 |
| 6,747,696 B1* | 6/2004 | Nakata et al. ................ 348/243 |

* cited by examiner

*Primary Examiner*—Jingge Wu
*Assistant Examiner*—Hadi Akhavannik
(74) *Attorney, Agent, or Firm*—Thomas, Kayden, Horstemeyer & Risley

(57) ABSTRACT

This invention is related to a method and an apparatus for reducing the zippers of image. The method uses a recovery model to reduce the zippers of image. The recovered model performs calculations which comprise the steps of setting a type of light sources and a sensing mode, measuring a voltage difference, estimating an amount of interference by a statistic method and establishing an interference model according to the amount of interference, and calculating the recovered model according to the interference model.

17 Claims, 14 Drawing Sheets

| $P_{00}$ | $P_{01}$ | $P_{02}$ | $P_{03}$ | $P_{04}$ | $P_{05}$ | $P_{06}$ | $P_{07}$ | $P_{08}$ | $P_{09}$ | ··· Line0 |
| $P_{10}$ | $P_{11}$ | $P_{12}$ | $P_{13}$ | $P_{14}$ | $P_{15}$ | $P_{16}$ | $P_{17}$ | $P_{18}$ | $P_{19}$ | ··· Line1 |
| $P_{20}$ | $P_{21}$ | $P_{22}$ | $P_{23}$ | $P_{24}$ | $P_{25}$ | $P_{26}$ | $P_{27}$ | $P_{28}$ | $P_{29}$ | ··· Line2 |
| $P_{30}$ | $P_{31}$ | $P_{32}$ | $P_{33}$ | $P_{34}$ | $P_{35}$ | $P_{36}$ | $P_{37}$ | $P_{38}$ | $P_{39}$ | ··· Line3 |
| $P_{40}$ | $P_{41}$ | $P_{42}$ | $P_{43}$ | $P_{44}$ | $P_{45}$ | $P_{46}$ | $P_{47}$ | $P_{48}$ | $P_{49}$ | ··· Line4 |

APPARATUS FOR REDUCING ZIPPER OF IMAGE AND METHOD THEREOF

FIELD OF THE INVENTION

This invention is related to an image processing method, and more particularly, to a method and an apparatus using a recovery model to reduce the zippers of image.

DESCRIPTION OF RELATED ART

Nowadays, digital scanners, digital still cameras and digital camcorders become more and more popular in the daily life. However, because of some limitations in processing the digital image, the quality of the digital image is not as good as the traditional photo.

One of the limitations is the zipper of image. FIG. 1 demonstrates a typical example of the zipper of image. The detailed description of the zipper is described as follows.

FIG. 2 briefly illustrates the operation of a CCD. The Charge Coupled Device (CCD) comprises an odd image sensor 11 and an even image sensor 12. The output signals from the odd image sensor 11 and the even image sensor 12 are combined to form a mixed output signal 10. Thus, data of a horizontal line comprises the output of the odd image sensor 11 and that of the even image sensor 12.

FIG. 3 shows the arrangement of pixel data of the horizontal lines. In this figure, the odd image sensor 11 and the even image sensor 12 are arranged in parallel and have a gap in between. When the width of the gap is equal to the thickness of a line, the even image sensor 12 senses the even pixels of line 0 whereas the odd image sensor 11 senses the odd pixels of the line 2. The output sequence of the time 1 will be P00, P21, P02, P23, P04, P25 etc.; the output sequence of the time 2 will be P10, P31, P12, P33, P14, P35 etc.; the output sequence of the time 3 will be P20, P41, P22, P43, P24, P45 etc. and so forth. Thus, the whole image will be obtained.

If the region of the FIG. 3 is white, the output at time 1 will be that shown in FIG. 4A. If the region of the FIG. 3 is black, the output at time 1 will be that as shown in FIG. 4B. If the line 0 of the FIG. 3 is black and the line 1 and up are white, the theoretic output data will be that shown in FIG. 4C. However, because the adjacent voltages interfere each other and the charge change cannot be very fast, the real output will be that as shown in FIG. 4D. The high voltage $V_h$ is less than the standard high voltage $V_W$, the low voltage $V_l$ is higher than the standard low voltage $V_B$. After combining the output of the odd and even image sensors, the output of the Line 0 will be that as shown in FIG. 4E and the output of the line 2 will be that as shown as FIG. 4F. Because of the differences of the acquiring time, the voltages of the adjacent pixels are different. Thus, the quality of the color is faded. This phenomenon is called zipper on the edges of image. As shown in FIG. 1, at the region when there are large differences in the color grades, the zipper phenomenon is presented.

The conventional method uses the averaging method to solve the zipper. In the averaging method, the voltages of the adjacent pixels are averaged. As described in FIG. 3, the line 0 is black and the line 1 and up are white. In the averaging method, the value of (P00+P01)/2 is assigned to P00, the value of (P01+P02)/2 is assigned to P01, and so forth. Thus, the output of the Line 0 will be that shown in FIG. 5A, and the output of the Line 2 will be that shown in FIG. 5B.

The Zippers disappear. In comparison with the Vh and Vl, the Vah and the Val are closer to the $V_W$ and $V_B$ respectively. Thus, the phenomenon of the color fading is reduced. However, although the phenomenon of zipper and the color fading is reduced, the averaging method will distort the color of the image. This invention provides a better method to reduce the zippers without distorting the color.

SUMMARY OF THE INVENTION

The primary object of this invention is to provide an apparatus and a method to reduce the zippers of image. This invention uses a recovery model to improve the quality of the image data.

The secondary object of this invention is to solve the color distortion in the averaging method.

In a preferred embodiment, the present invention discloses a method for building a recovery model. The recovered model can be obtained by the steps of: (A) producing a plurality of outputted signals according to a plurality of brightness, wherein the brightness are not all the same; (B) measuring a plurality of differences according to the outputted signals and a plurality of theoretical signals corresponding to the brightness; (C) establishing an interference model according to the differences; and (D) producing the recovery model according to the interference model.

A preferred embodiment to use the recovery model for reducing the zippers of image in accordance with the present invention comprises the steps of: receiving a pixel data of an image data; calculating the pixel data by the recovery model according to a difference of the pixel data and at least one adjacent pixel data; and repeating the receiving and calculating steps and producing a recovered image data form a plurality of calculated pixel data.

The apparatus for reducing a zipper of image comprises a recovery module and a processing logic. The recovery module stores a recovery model having a plurality of recovery parameters. The recovery parameters are corresponding with the zipper. The processing logic is coupled to the recovery module for receiving a digital image data. The processing logic also calculates the digital image data with the recovery parameters to produce a recovered image data. Wherein, the zipper of the recovered image data is better than that of the digital image data.

The various objects and advantages of the present invention will be more readily understood from the following detailed description when read in conjunction with the appended drawings.

BRIEF DESCRIPTION OF THE PREFERRED EMBODIMENTS

Figure 1:
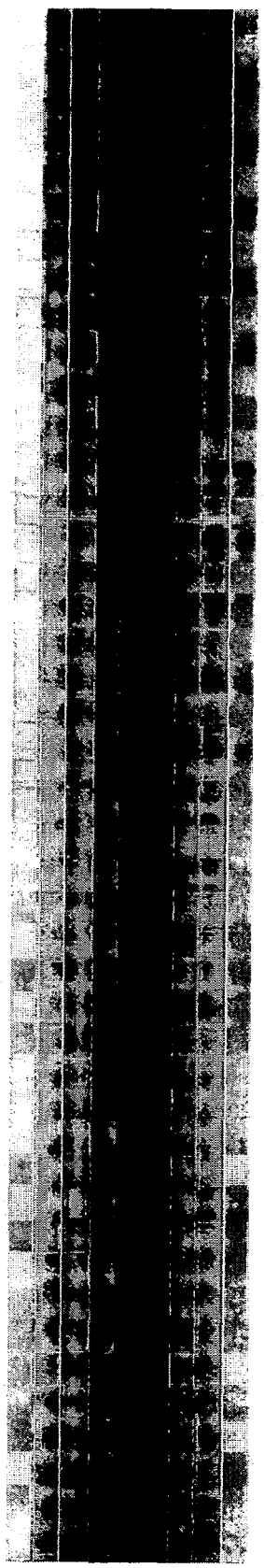
FIG. 1 shows the zippers of the image data.
Figures 2, 3:
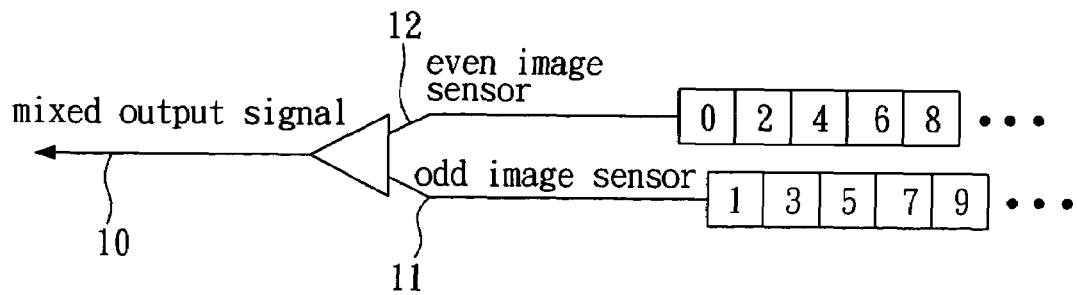
FIG. 2 shows the block diagram of a CCD.
FIG. 3 shows the arrangement of pixel data of the horizontal lines.
Figure 4A:
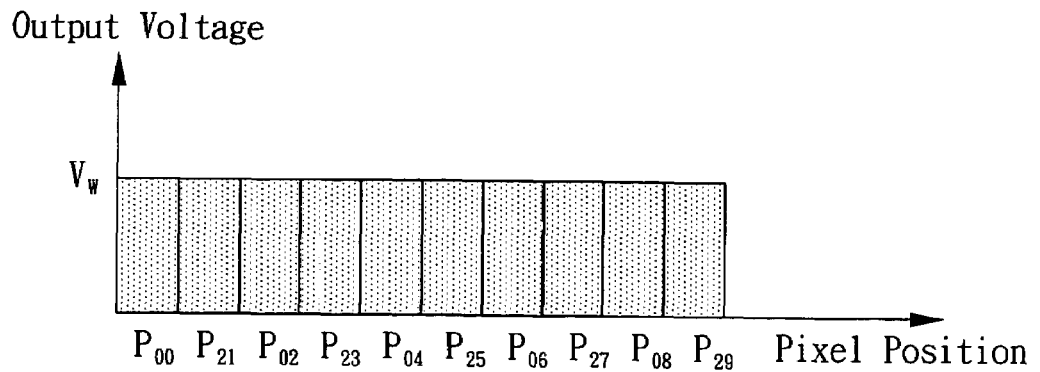
FIG. 4A is an output of an image sensor when sensing the white regions.
Figure 4B:
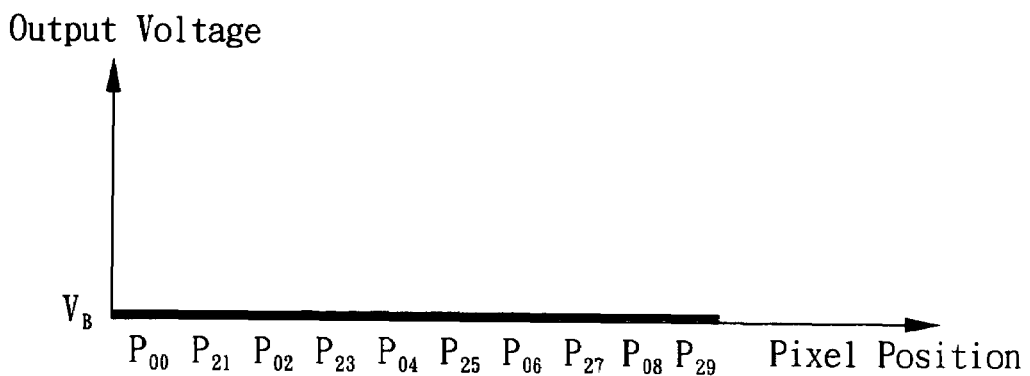
FIG. 4B is an output of an image sensor when sensing the black regions.
Figure 4C:
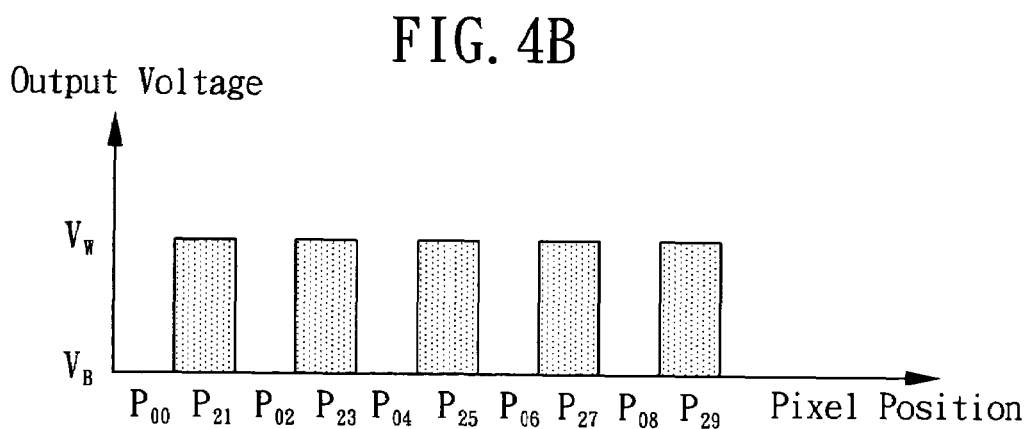
FIG. 4C is a theoretic output of an image sensor when the differences of the color grades are big.
Figure 4D:
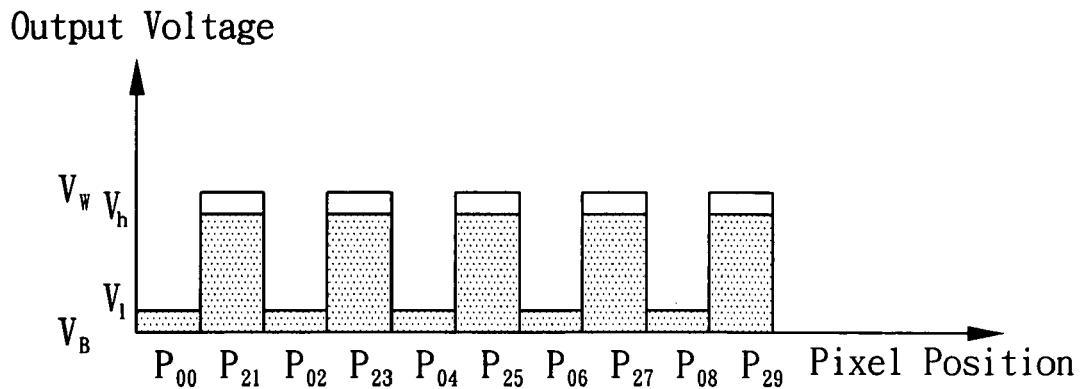
FIG. 4D is a real output of an image sensor when the differences of the color grades are big.
Figure 4E:
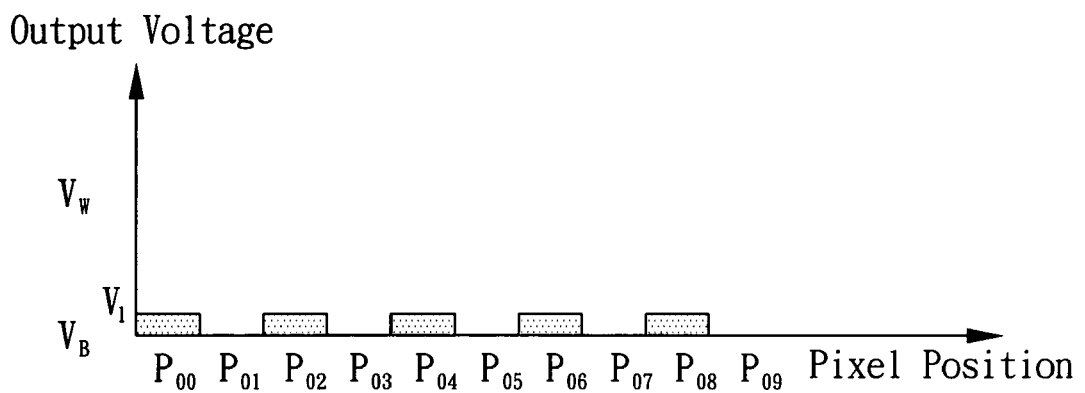
FIG. 4E is the output when the line 0 is affected by the zipper phenomenon.
Figure 4F:
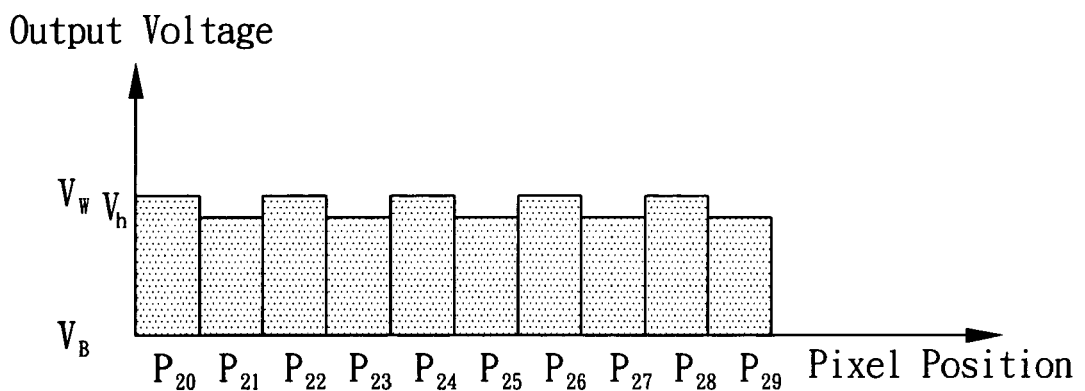
FIG. 4F is the output when the line 2 is affected by the zipper phenomenon.
Figure 5A:
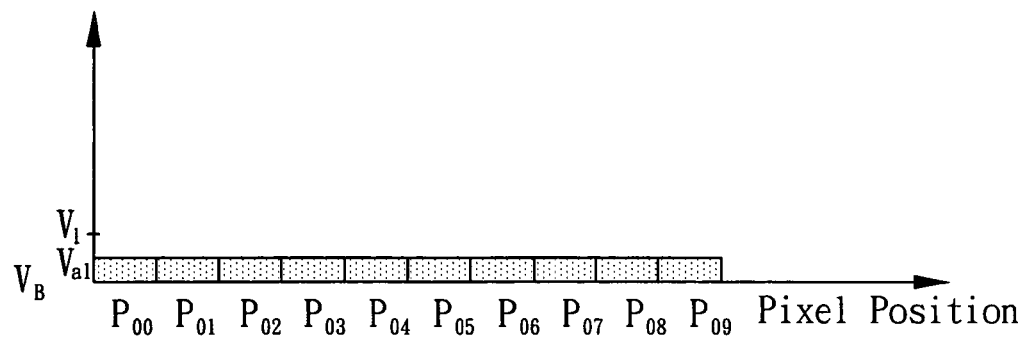
FIG. 5A is the output of the line 0 in the averaging method.
Figure 5B:
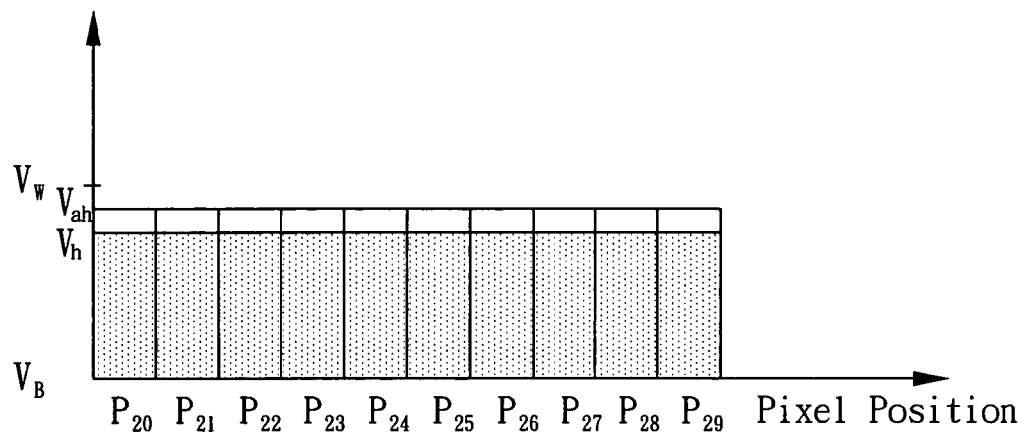
FIG. 5B is the output of the line 2 in the averaging method.
Figure 6A:
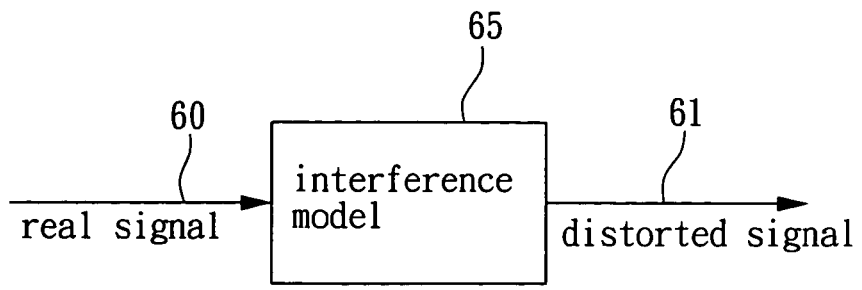
FIG. 6A is the block diagram of the cause of the zipper phenomenon.

The block diagram in FIG. 6A shows the cause of the zipper phenomenon. The real signal 60 from the image sensor is interfered and becomes a distorted signal 61 with a zipper output therefrom. The interference is modeled as an interference model 65. The mixed output signal 10 in FIG. 2 is the distorted signal 61. The real signal 60, interference model 65, and the distorted signal 61 are denoted as x, A and y, in respectively. The relation of x, A and y can be mathematically described as:

$$y = Ax \quad \text{Equation 1}$$

Figure 6B:
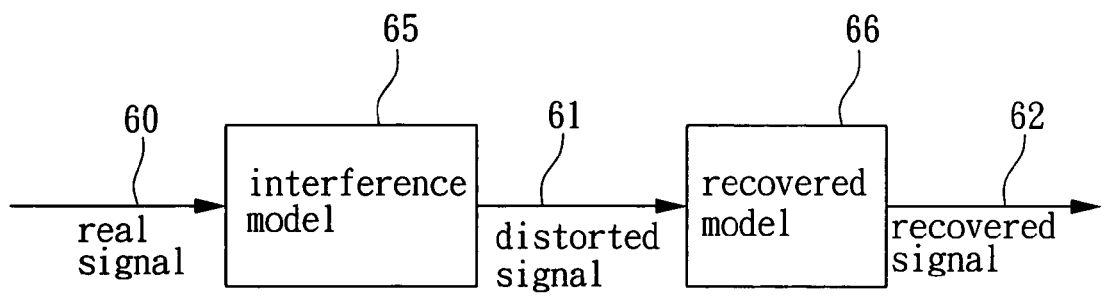
FIG. 6B describes the principle of this invention.

FIG. 6B describes the principle of this invention. This invention uses a processing apparatus to overcome the zipper before outputting a recovered signal 62 so that the recovered signal 62 is similar to the real signal 60. A recovered model 66 is estimated and neutralizes the interference model 65. Because the recovered model 66 neutralizes the interference effect of the interference model 65, the quality of the recovered signal 62 is better than that of the distorted signal 61. The recovered model 66 and the recovered signal 62 are denoted as B and r, in respectively. The relation of r, B and y can be mathematically described as:

$$r = By \quad \text{Equation 2}$$

We can produce r=BAx according to equation 1 and equation 2

We assume $B = A^{-1}$, because B neutralizes the effect of A $r = A^{-1} Ax$

Thus r=x

Figure 6C:
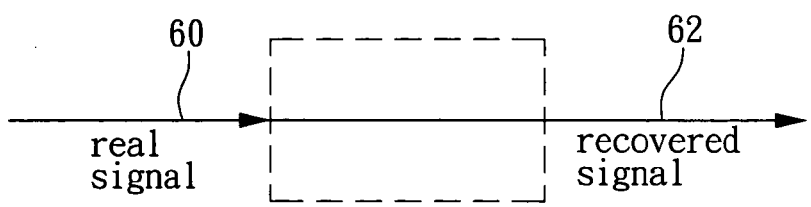
FIG. 6C shows an equivalent block diagram of the FIG. 6B.

After using the recovered model 66 to neutralize the interference model 65, the recovered signal 62 will be approximately equal to the real signal 60. As shown in FIG. 6C, the zipper is reduced.

According to the above descriptions, the parameters of the recovered model 66 will influence the effect of the zipper reduction. Thus, establishing a good recovered model 66 is beneficial. The recovered model 66 can be established according to the statistic, or the mathematic polynomial methods. An embodiment of this invention uses the statistic method. In the embodiment, the statistic method is for analyzing the errors and the distributions based on the real data. In the embodiment, the statistic model which also called Nearly Decoupled Model is popular in academic and industrial applications.

The basic principle of the method for building the recovery model in accordance with the present invention generally comprises the following steps:

(A) producing a plurality of outputted signals according to a plurality of brightness, wherein the brightness are not all the same;

(B) measuring a plurality of differences according to the outputted signals and a plurality of estimated signals corresponding to the brightness;

(C) establishing an interference model according to the differences; and (D) producing the recovery model according to the interference model.

Figure 7A:
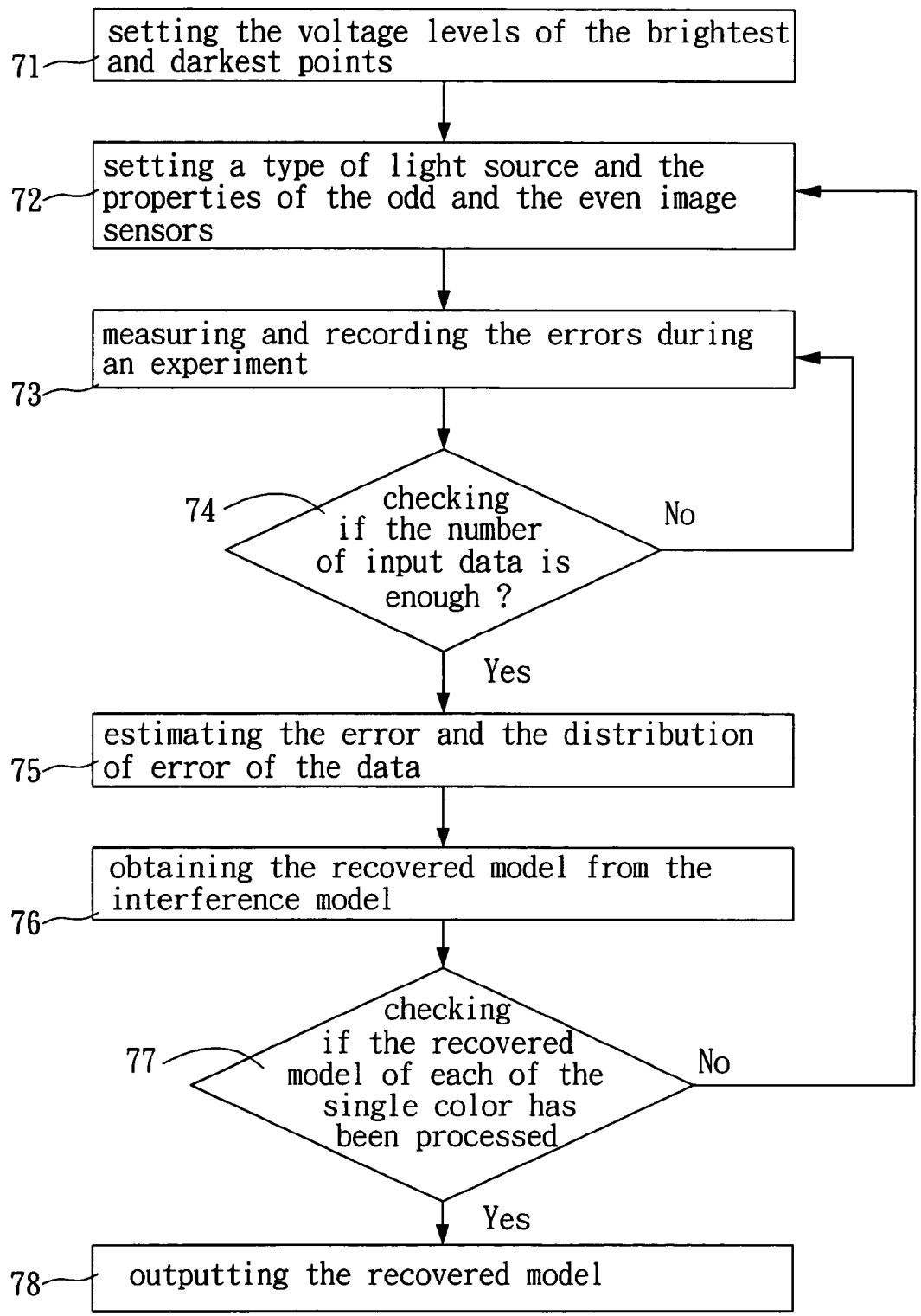
FIG. 7A shows the flowchart of using a statistic method to calculate the recovered model in the invention.

Detailed embodiment for establishing and performing the method described above can be illustrated by FIGS. 7A and 7C. FIG. 7A shows the flowchart of using a statistic method to calculate the recovered model 66. This invention designs the following steps to establish the recovered model 66:

Step 71: setting the voltages of the brightest and darkest brightness. If the brightest voltage is higher, the zipper of image would be more serious. If the brightest voltage is lower, the amount of grades for presenting the colors of image will become less which affects the quality of the color.

Step 72: setting a type of light source and the properties of the odd image sensor 11 and the even image sensor 12. Because the colors are composed of red, green and blue, and these three colors are independent, therefore the recovered models of each of the three colors can be calculated individually. Because the modes of sensing can be either from brightest to darkest or from darkest to brightest, the recovered models of each of the three colors will be calculated separately at both modes. The completed recovered model 66 can be established by combining the recovered models of each of the three colors at two different modes.

Step 73: producing a measured voltage according to an input brightness and measuring and recording the voltage difference according to the measured voltage and a theoretical voltage corresponding to the input brightness. Although the zipper is not severe when the voltages are not at high or low peaks, the image will still be affected. In order to obtain a precise recovered model, the distorting is measured not only on peaks voltages but also in between.

Step 74: checking if the number of input data is enough according to the statistic model. If the number of input data is not enough, it will return to the step 73. If the number of input data is enough, it will proceed to the step 75.

Step 75: using a mathematic method to establish the interference model 65 according to the voltage differences obtained from the step 73.

Step 76: producing the recovered model 66 from the interference model 65 obtained from step 75. Wherein the recovered model 66 is used to neutralize the effect of the interference model 65, the recovered model 66 is an inverse function of the interference model 65.

The recovered model 66 or the interference model 65 can be calculated by the Neural Network, Fuzzy Logic, Matrix Model or Nearly Decoupled Model. The parameters of the recovered model 66 or the interference model 65 can be calculated by a Neural Network, the Least Square Method, Optimization Method or $H^\infty$ method.

Figure 7B:
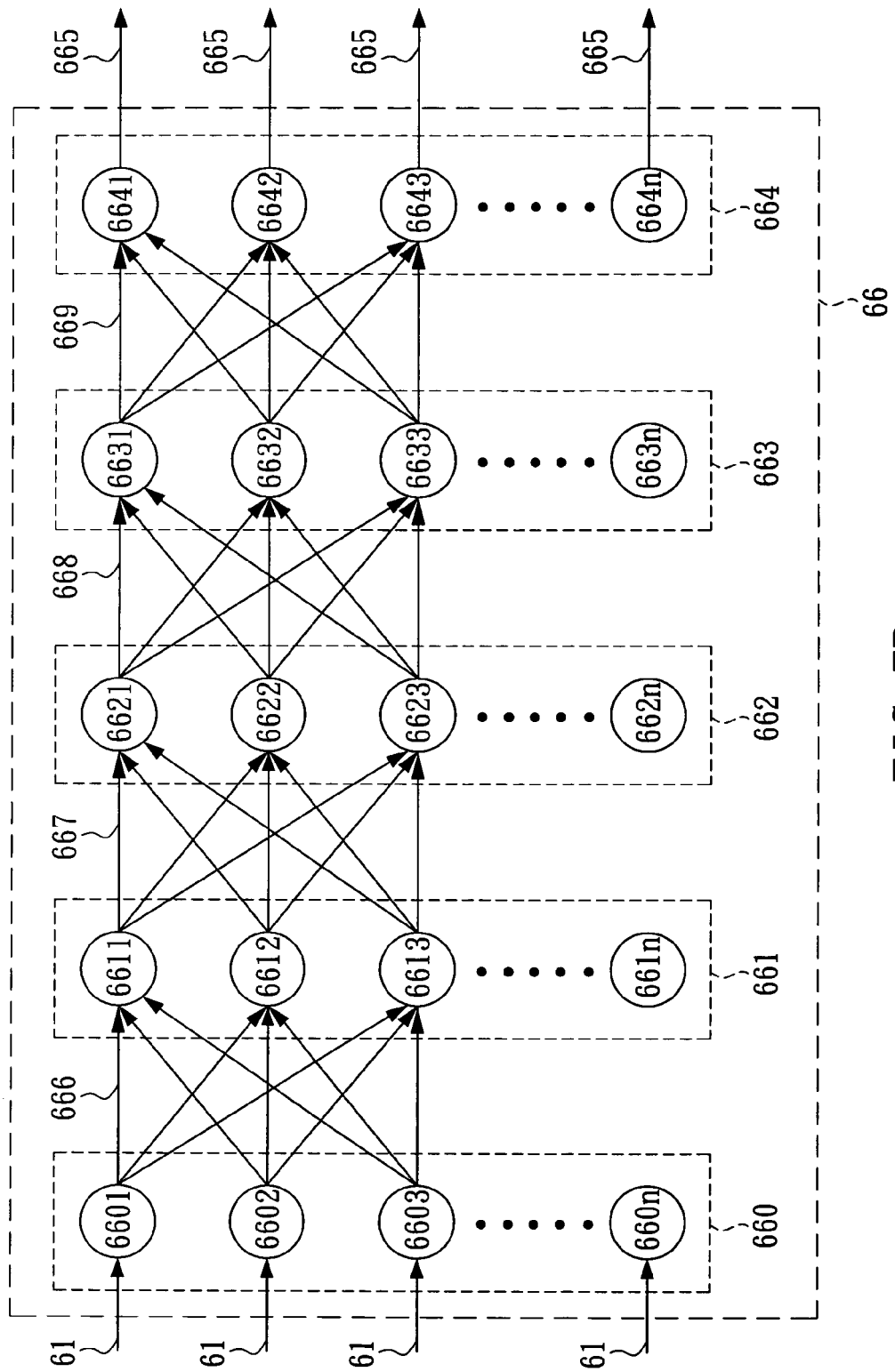
FIG. 7B shows an embodiment of the recovered model of the invention.

FIG. 7B shows an embodiment of the recovered model 66 in this invention. The embodiment comprises three layers of neural networks. It is assumed that there are m sets of data obtained from step 73. As shown in FIG. 7B, when calculating the recovered model 66, the distorted signal 61 with a length of n input to the input stage units 6601~660n of an input stage 660 of the neural network and multiply with a first weight, respectively. The first stage unit 6611 of the first stage neural network 661 is the sum of each of the output of the input stage units 6601-660n. In other words, the unit 6611 of the first stage neural network 661 is the sum of each of the first stage units 6601~660n multiplied with the first weight. The first stage unit 6612 of the first stage neural network 662 is the sum of each of the input stage units 6601~660n multiplied with the first weight. Thus, these first stage units 6611~661n of the first stage neural network 661 can be obtained. The set of the first weight 666 is denoted as $W_1$ and the initial values of the set of the first weight 666 are random values.

Figure 7C:
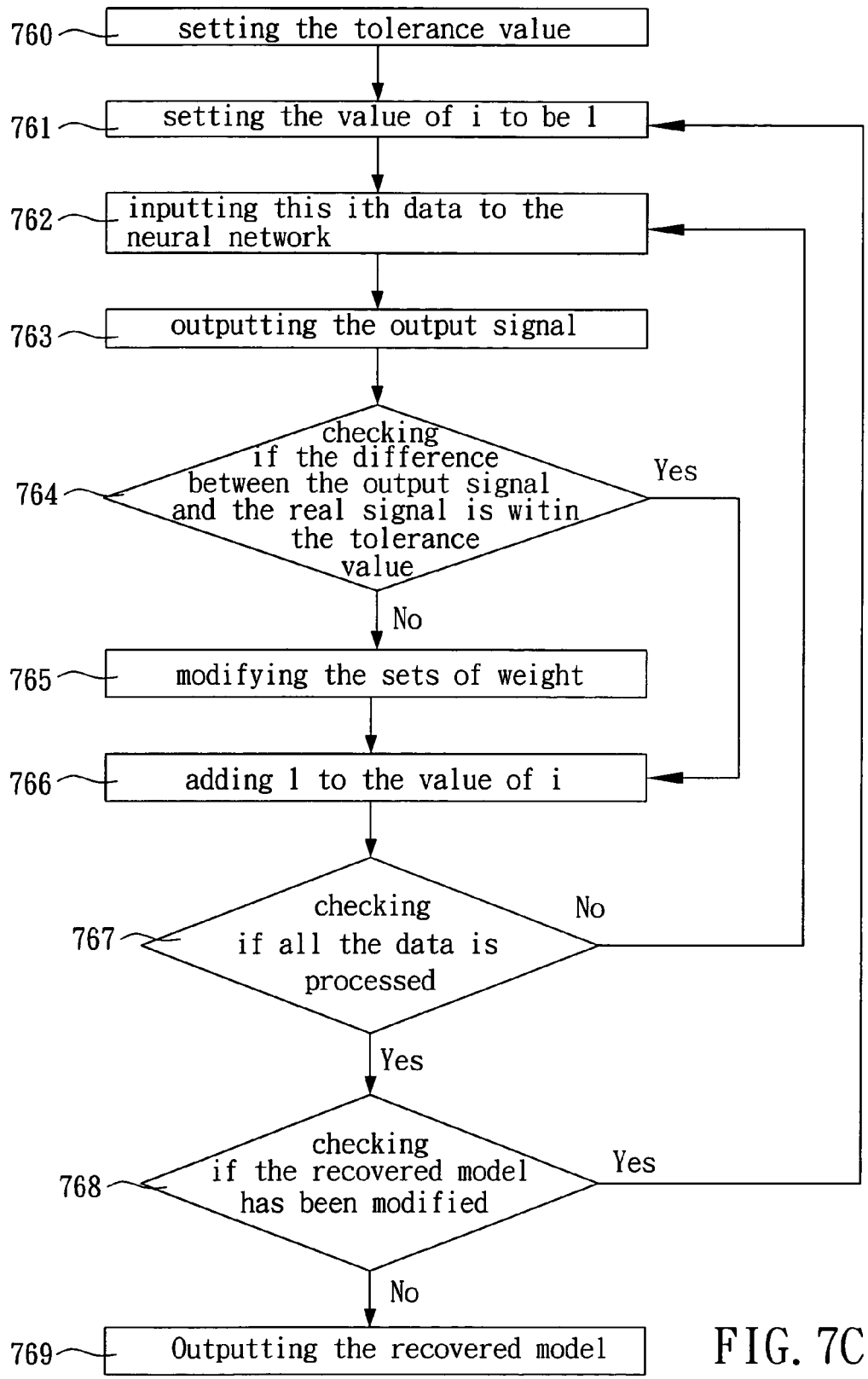
FIG. 7C shows the flowchart of using the Neural Network method to calculate the recovered model.

The set of the second weight 667 located between the first stage 661 and the second stage 662 is denoted as $W_2$. The set of the third weight 668 located between the second stage 662 and the third stage 663 is denoted as $W_3$. The set of the fourth weight 669 located between the third stage 663 and the output stage 664 is denoted as $W_4$ and the initial values of the set of the fourth weight 669 are random values. Thus, the output stage 664 of the neural network outputs an output signal 665. The sets of the weight 666~669 are reversely modified according to a difference between the output signal 665 and the real signal 60. In other words, firstly, the set of the fourth weight $W_4$ is modified according to the difference; secondly, the set of the third weight $W_3$ is modified according to the set of the modified fourth weight $W_4$; and so forth. Please refer to FIG. 7C, FIG. 7C shows the flowchart of using the Neural Network method is for calculating the recovered model 66. The flowchart in FIG. 7C is an embodiment of the step 76 in the FIG. 7A. The step 76 comprises the steps of:

Step 760: setting the tolerance value. The tolerance value refers to the maximum tolerant differences between the output signal 665 and the real signal 60. If the differences between the output signal 665 and the real signal 60 is larger than the tolerance value, the neural network needs further learning. If the tolerance value is set to be over large, the quality of the recovered model 66 will be bad. If the tolerance value is set to be too small, there is possibility of failing to obtain the recovered model 66.

Step 761: setting the value of i to be 1 so the processing will start from the first data.

Step 762: inputting this $i^{th}$ data to the neural network as shown in FIG. 7B.

Step 763: outputting the output signal 665.

Step 764: checking if the difference between the output signal 665 and the real signal 60 is within the tolerance value. If yes, the recovered model 66 will not be modified and the step 766 will be proceeded. If no, the recovered model 66 is needed to be modified and the step 765 will be proceeded.

Step 765: modifying the sets of weight 669-666 to improve the quality of the recovered model 66.

Step 766: adding 1 to the value of i in order to proceed to the next data.

Step 767: checking if all the data is processed. If yes, the procedure it is finished. If no, the step 762 is proceeded.

Step 768: checking if the recovered model 66 has been modified. If yes, the step 761 is proceeded. If no, the step 769 is proceeded. If the recovered model 66 has not been modified, it indicates that the recovered model 66 is ideal. This is also called the training of the recovered model. The more the training, the better the recovered model 66.

Step 769: Outputting the recovered model of a single color (i.e. Red or Green or Blue color).

Step 77: checking if the recovered model of each of the single color has been processed. If no, step 72 is proceeded. If yes, step 78 is proceeded. The total of six recovered models of each of the three single colors are checked.

Step 78: combining the six recovered models and outputting the recovered model 66.

Figure 8:
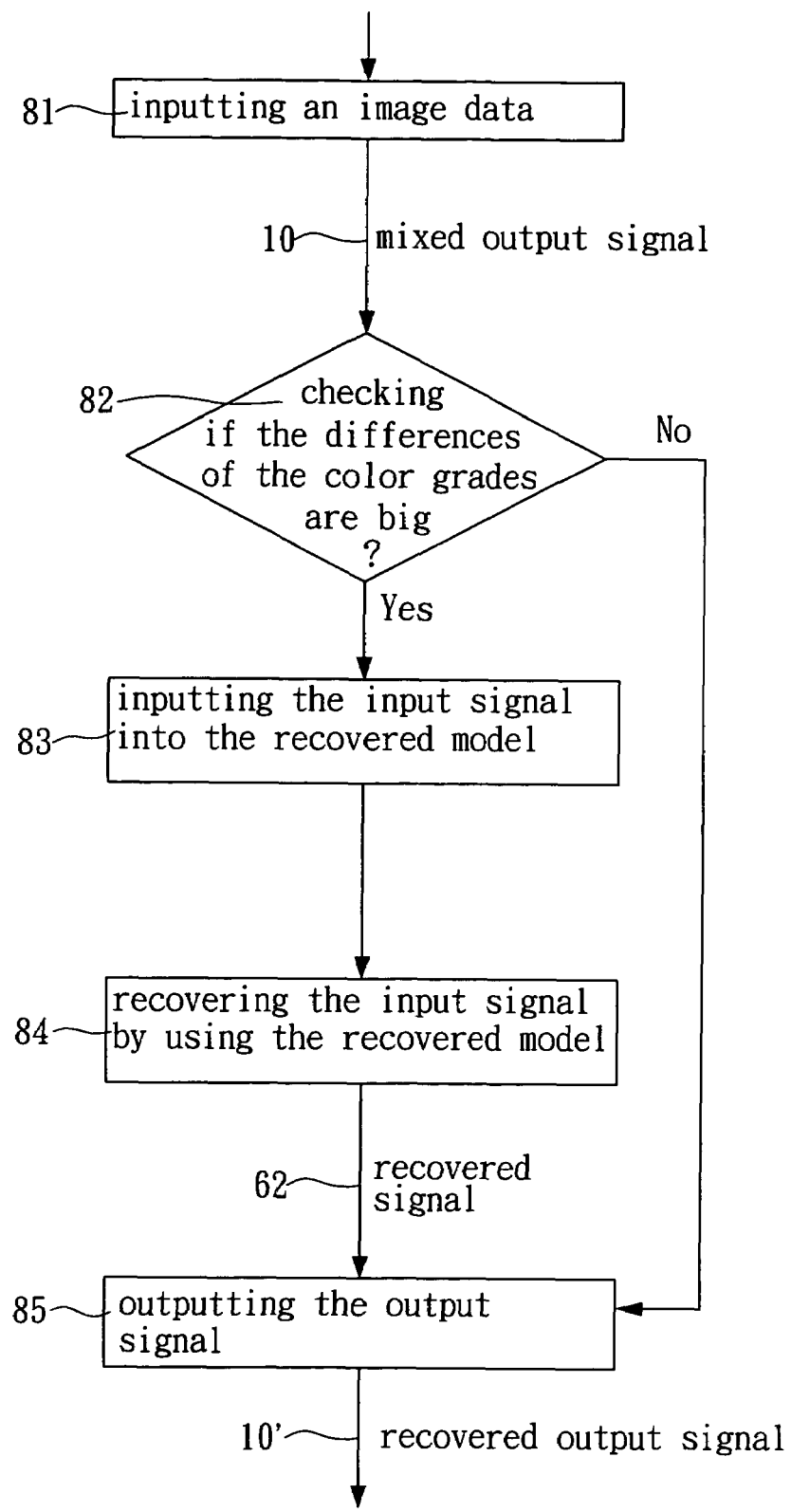
FIG. 8 shows a flowchart of operation in this invention.

FIG. 8 shows the flowchart of the operation for applying the recovery model to reduce the zipper of image data in this invention.

Step 81: inputting an input signal of an image data which is the mixed output signal 10 of FIG. 2.

Step 82: checking if the differences of the color grades between the two adjacent regions are big. If no, step 85 is proceeded and the input signal is outputted. If yes, step 83 is proceeded.

Step 83: inputting the input signal into the recovered model.

Step 84: recovering the input signal by using the recovered model 66 to reduce the zipper and producing an output signal 62.

Step 85: outputting the output signal 62 which is a recovered image signal 10'.

Figure 9:
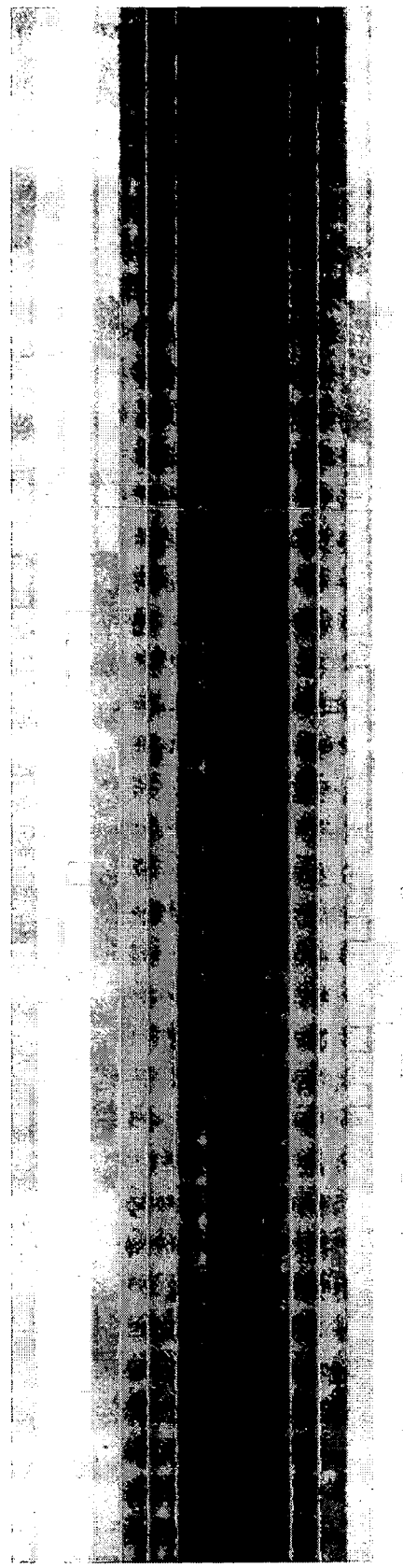
FIG. 9 shows a result of using the recovered model of this invention to reduce the zippers of an image data.

The output of the recovered image signal 10' is shown in FIG. 9. In the FIG. 9, the zipper of the image data is reduced and the quality of the image data is improved.

Figure 10A:
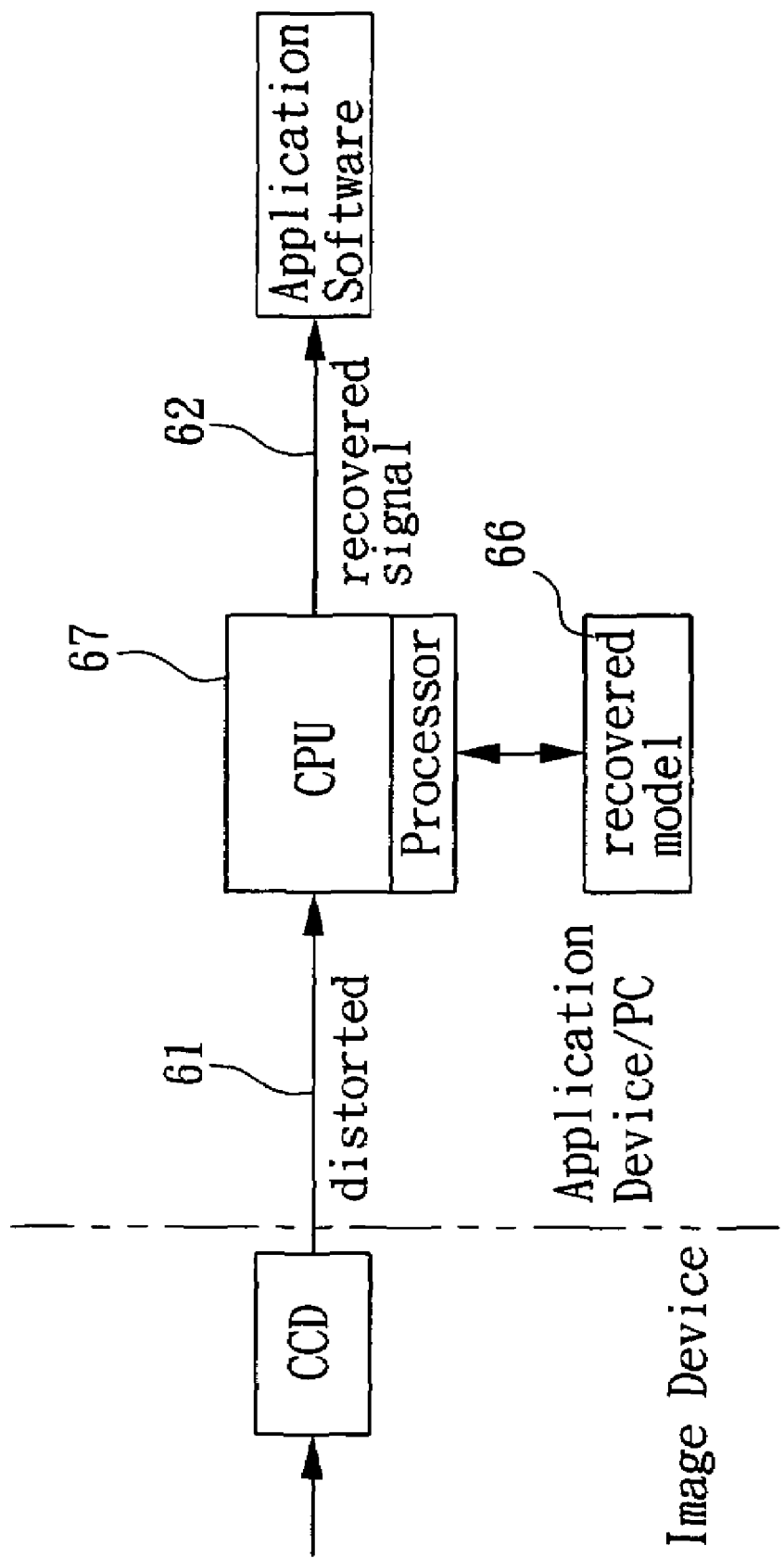
FIG. 10A shows a block diagram of a first embodiment of this invention.

FIG. 10A is a first embodiment of this invention. This first embodiment is a software type apparatus for reducing the zipper of the image data. The CCD outputs an input signal 61 into the software type apparatus 67. An example of the software type apparatus 67 is a CPU of a computer and corresponding software. The CPU uses the corresponding software, the recovered model 66, to reduce the zipper of the image data, and outputs the recovered signal 62 to the application software, such as Photoshop.

Figure 10B:
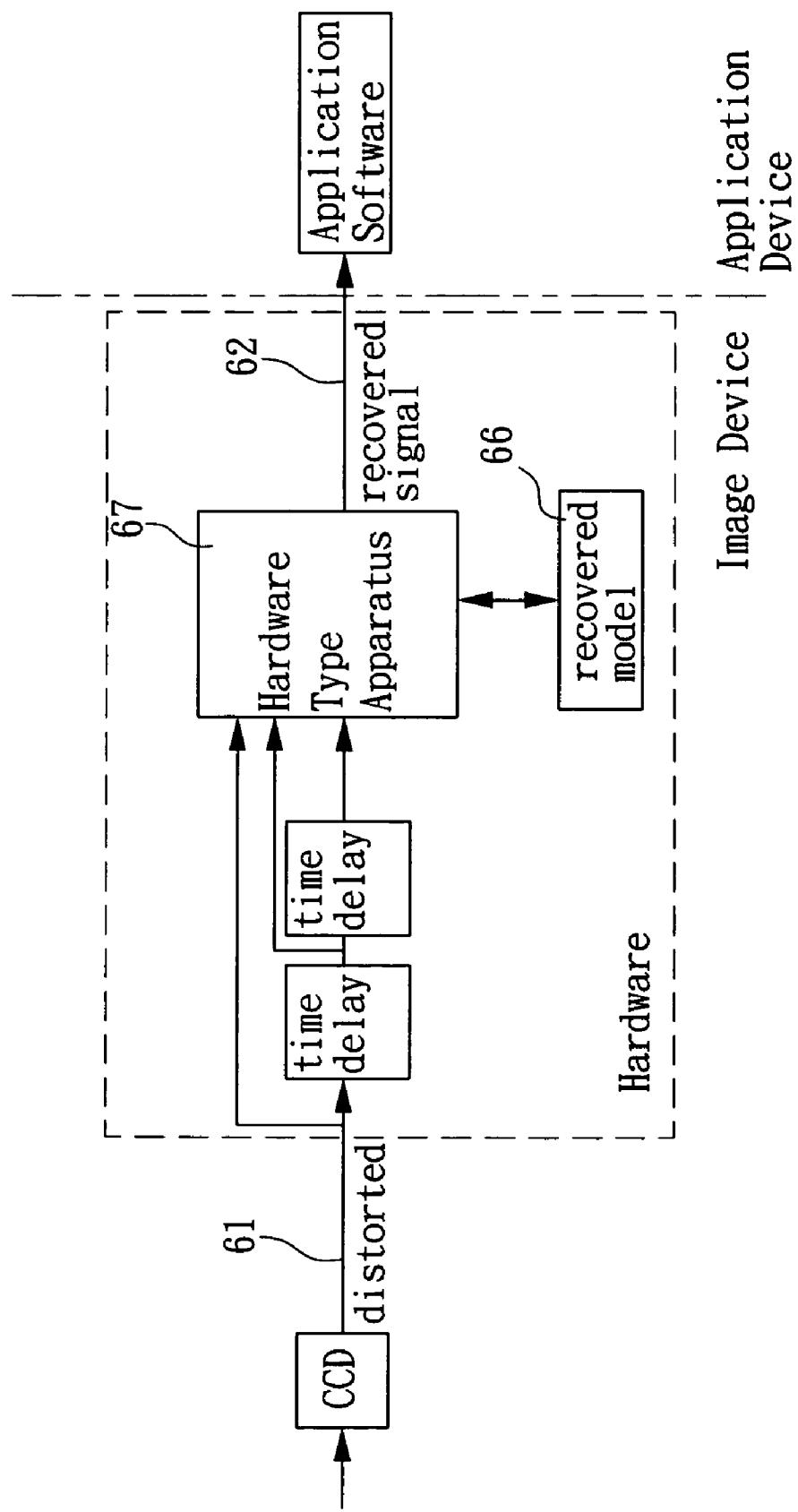
FIG. 10B shows a block diagram of a second embodiment of this invention.

FIG. 10B shows a second embodiment of this invention. This second embodiment is a hardware type apparatus for reducing the zipper of the image data. The CCD outputs an input signal 61 to a first delay unit and the hardware type apparatus 67. The first delay unit outputs a first delayed signal to a second delay unit and the hardware type apparatus 67. The second delay unit outputs a second delayed signal to the hardware type apparatus 67. The hardware type apparatus 67 receives these three signals, uses the recovered model 66 to reduce the zipper and outputs the recovered signal 62.

Figure 10C:
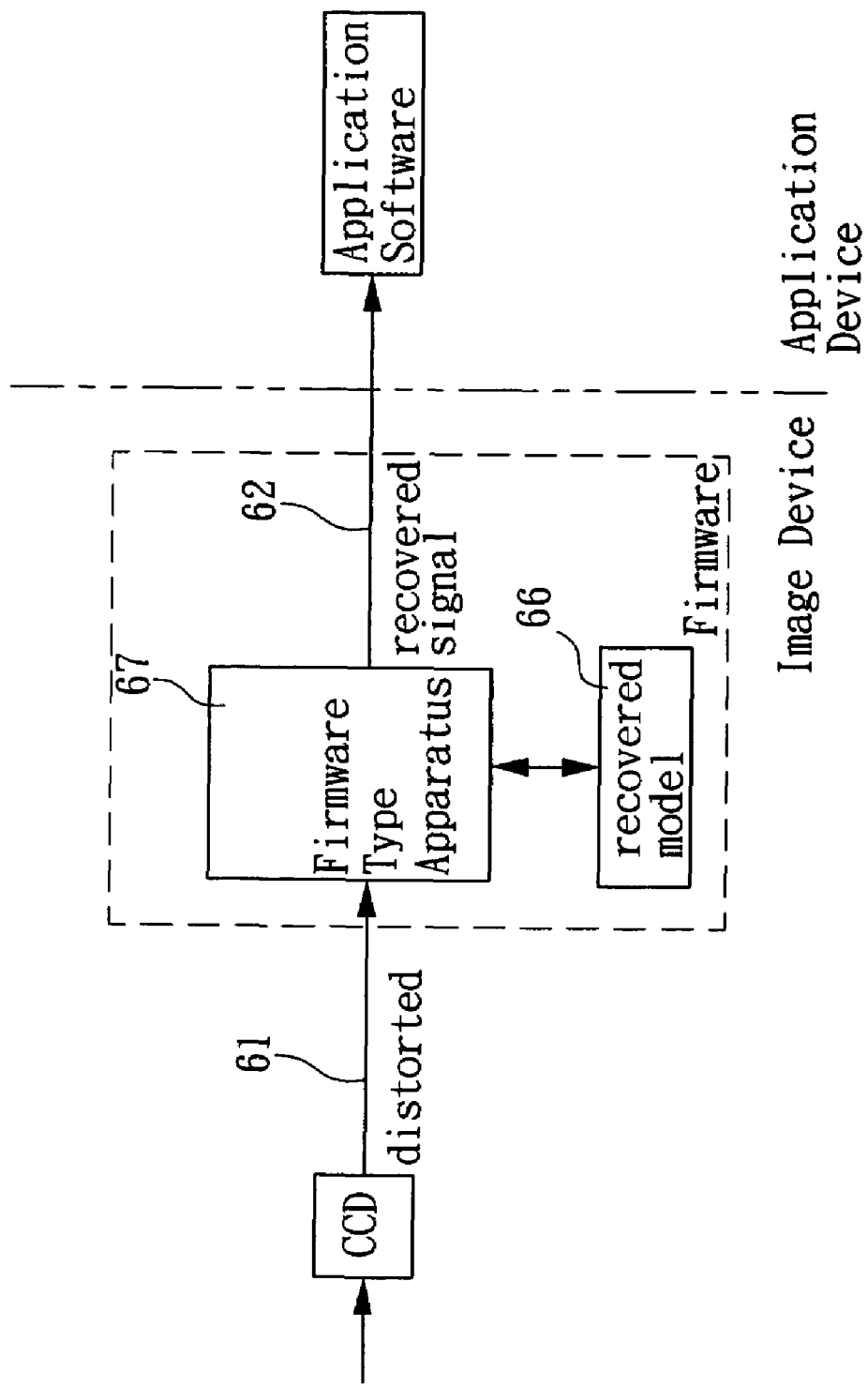
FIG. 10C shows a block diagram of a third embodiment of this invention.

FIG. 10C shows the third embodiment of this invention. This embodiment is a firmware type apparatus 67 for reducing the zipper of image data. The CCD outputs an input signal 61 to the firmware type apparatus 67. The firmware type apparatus 67 uses the recovered model 66 to reduce the zipper of the image data and outputs the recovered signal 62.

While the present invention has been shown and described with reference to preferred embodiments thereof, and in terms of the illustrative drawings, it should be not considered as limited thereby. Various possible modification, omission, and alterations could be conceived of by one skilled in the art to the form and the content of any particular embodiment, without departing from the scope and the spirit of the present invention.

What is claimed is:

1. A method for building a recovery model, the recovery model being used to reduce a zipper of image data, said method comprising:

producing a plurality of outputted signals from image sensors according to a plurality of brightness, wherein the brightness are not all the same;

measuring a plurality of differences according to the outputted signals and a plurality of estimated signals corresponding to the brightness, wherein the plurality of estimated signals vary in magnitude in relation to the brightness intensity;

establishing an interference model according to the differences, wherein the interference model is a mathematical model that describes an effect of distortion on a real signal caused by a mixing of outputs from a first image sensor and a second image sensor;

producing the recovery model according to the interference model, such that the recovery model is a mathematical inverse of the interference model; and applying the recovery model to the a distorted signal to generate a recovered signal, wherein the recovered signal has reduced zipper of the image data.

2. The method of claim 1, wherein the step of producing the recovery model through a mathematic method according to the interference model.

3. The method of claim 2, wherein the mathematic method is Neural Network or Fuzzy Control or Matrix model or Nearly Decoupled Model.

4. The method of claim 3, wherein the Neural Network method comprises:
setting a tolerance value;
inputting a plurality of input data into an initial model;
producing an output data from the initial model;
modifying the initial model according to a difference of the output data and the input data; and
outputting the modified model as the recovered model.

5. A method for improving a quality of digital image data through a recovery model, the method comprising:
receiving a pixel data of the digital image data;
calculating the pixel data by the recovery model according to a difference of the pixel data and at least one adjacent pixel data, wherein the recovery model is a mathematical inverse of a model that describes an effect of distortion on a real signal caused by a mixing of outputs from an odd image sensor of a CCD (charge coupled device) and an even sensor of the CCD; and
producing a plurality of outputted signals according to a plurality of brightness, wherein the brightness are not all the same;
measuring a plurality of differences according to the outputted signals and a plurality of estimated signals corresponding to the brightness, wherein the plurality of estimated signals vary in magnitude in relation to the brightness intensity;
establishing an interference model according to the differences, wherein the interference model is a mathematical model that describes an effect of distortion on a real signal caused by a mixing of outputs from a first image sensor and a second image sensor;
producing the recovery model according to the interference model; and
using the recovery model to reduce the zipper of image data.

6. The method of claim 5, wherein the zipper of the recovered image data is not as serious as that of the digital image data.

7. The method of claim 5, wherein the step of producing the recovery model through a mathematic method according to the interference model.

8. The method of claim 7, wherein the mathematic method is Neural Network or Fuzzy Control or Matrix model or Nearly Decoupled Model.

9. The method of claim 8, wherein the Neural Network comprising:
setting a tolerance value; inputting a plurality of input data into an initial model;
producing an output data from the initial model; modifying the initial model according to a difference of the output data and the input data; and
outputting the modified model as the recovered model.

10. An apparatus for reducing a zipper of image data, comprising:

a recovery module for storing a plurality of recovery parameters, the recovery parameters are corresponding to the zipper, wherein the recovery model is a mathematical inverse of a model that describes an effect of distortion on a real signal caused by a mixing of outputs from a first image sensor and a second image sensor; and a processing logic, coupled to the recovery module, for receiving a digital image data, and calculating the digital image data with the recovery parameters to produce a recovered image data; wherein the processing logic further includes logic for producing a plurality of outputted signals according to a plurality of brightness, wherein the brightness are not all the same;

logic for measuring a plurality of differences according to the outputted signals and a plurality of estimated signals corresponding to the brightness, wherein the plurality of estimated signals vary in magnitude in relation to the brightness intensity;

logic for establishing an interference model according to the differences, wherein the interference model is a mathematical model that describes an effect of distortion on a real signal caused by a mixing of outputs from a first image sensor and a second image sensor;

logic for producing the recovery model according to the interference model; and logic for using the recovery model to reduce the zipper of image data.

11. The method of claim 10, wherein the step of producing the recovery model through a mathematic method according to the interference model.

12. The apparatus of claim 11, wherein the mathematic method is Neural Network or Fuzzy Control or Matrix model or Nearly Decoupled Model.

13. The apparatus of claim 10, wherein the processing logic is configured to perform the following functions:
receive a pixel data of an image data;
calculate the pixel data by the recovered model according to a difference of the pixel data and at least one adjacent pixel data; and
produce the recovered image data from the calculated pixel data.

14. The apparatus of claim 13, wherein the processing logic is a hardware or software or firmware.

15. The method of claim 1, wherein the step of producing a plurality of outputted signals more specifically comprises producing a plurality of measured voltages, each of the measured voltages corresponding to an input brightness, and wherein the step of measuring a plurality of differences according to the outputted signals more specifically comprises measuring a voltage difference between the measured voltages and a theoretical voltage corresponding to the input brightness.

16. The method of claim 5, wherein the step of producing a plurality of outputted signals more specifically comprises producing a plurality of measured voltages, each of the measured voltages corresponding to an input brightness, and wherein the step of measuring a plurality of differences according to the outputted signals more specifically comprises measuring a voltage difference between the measured voltages and a theoretical voltage corresponding to the input brightness.

17. The method of claim 1, wherein the first and second image sensors are an odd image sensor of a CCD (charge coupled device) and an even image sensor of the CCD.

* * * * *